United States Patent [19]

Gottfried

[11] Patent Number: 4,769,805
[45] Date of Patent: Sep. 6, 1988

[54] MINIATURIZABLE WRITE/READ HEAD FOR AN OPTICAL STORAGE SYSTEM

[75] Inventor: Norbert Gottfried, Baldham, Fed. Rep. of Germany

[73] Assignee: Siemens Aktiengesellschaft, Berlin and Munich, Fed. Rep. of Germany

[21] Appl. No.: 940,951

[22] Filed: Dec. 12, 1986

[30] Foreign Application Priority Data

Dec. 18, 1985 [DE] Fed. Rep. of Germany ....... 3544824

[51] Int. Cl.[4] .................. G11B 7/00; G11B 21/10; H01S 3/08
[52] U.S. Cl. .................................... 369/122; 369/43; 369/46; 372/24; 372/72; 372/92; 365/215
[58] Field of Search ................. 365/215; 369/43–46, 369/122, 32; 372/24, 70, 72, 92, 103

[56] References Cited

U.S. PATENT DOCUMENTS 3,242,439  3/1966  Ridgen et al.
3,440,560  4/1969  Pole
3,532,879  10/1970 Braunstein et al.
3,941,945  3/1976  Borner et al.
4,005,259  1/1977  Kaneko
4,190,775  2/1980  Sakurai et al.

OTHER PUBLICATIONS

Finck et al., "Ein Halbleiterlaser zum Auslesen von Information" Philips Technische Rundschau, 39th Edition No. 4, 1980/81, pp. 101–111.

Zook et al., "Geometrical Interpretation of Gaussian Beam Optics" Applied Optics, vol. 11, No. 10, Oct. 1972, pp. 2140–2145.

Abstract of Japanese Patent No. 55-12509, Patents Abstracts of Japan, vol. 4, No. 39 (P-4)(521), Mar. 28, 1980.

Primary Examiner—Aristotelis M. Psitos
Attorney, Agent, or Firm—Hill, Van Santen, Steadman & Simpson

[57] ABSTRACT

A write/read head comprises a laser whose resonator faces are formed by the storage medium and by a curved reflective surface which is positioned at a nominal distance from the medium and has a described residual radiant transmittance and a radius of curvature which is greater than the nominal distance. A mode diaphragm is provided between the active medium of the laser and the storage medium. Optical detector elements for the acquisition of position control signals and data read-out signals are arranged outside of the reflective surface and are symmetrically arranged with respect to the optical axis of the laser.

7 Claims, 2 Drawing Sheets

MINIATURIZABLE WRITE/READ HEAD FOR AN OPTICAL STORAGE SYSTEM

BACKGROUND OF THE INVENTION

The present invention is directed to a miniaturizable write/read head for an optical storage system using an optical storage medium. The head includes a controlled laser as a light source which has one resonator face formed by the storage medium and is arranged with respect to the storage medium so that light reflected from the storage medium will be fed back into the laser for controlling the intensity of the emitted laser beam.

In optical storages, as known, information is in digital form and is written into the storage medium in parallel tracks with a high intensity or, respectively, is read out with a low intensity, sharply focussed light rays, usually emitted by a laser. In read-out control signals for the positioning of the write/read head are also usually acquired from the reflected light beam in addition to the output data signals. In optical storages, what is thereby involved among other things are two types of control signals, a malfocus signal and a track error signal, which are employed for the readjustment of the vertical spacing of the write/read head given focus errors, or respectively, for horizontal fine positioning of the write/read head given a track deviation of the light spot focus on the surface of the storage medium.

A laser is usually employed as a light source for both operating modes of write and read. A conventional image optics in the write/read head which focus the emitted laser beam onto the surface of the storage medium then contains optical elements for gating or splitting the reflected laser beam out of the beam path. The deflected reflected laser beam is then collected by photodetectors in order to acquire the control and read-out signals, respectively.

However, an article by Finck et al "Ein Halbleiterlaser zum Auslesen von Information "*Philips Technische Rundschau,* 39th Edition, No. 4, 1980/81, pages 101–111 discloses that information in the reflected light is detected with the assistance of the laser itself. In this case, the reflected light is not coupled out via a beam splitter, but is again imaged onto the exit mirror of the laser by the imaging optics. The active medium of the laser then reacts to the fluctuations of the light reflected from the surface of the storage medium with the reaction causing a modification of the emitted power. This modification is identified with the assistance of a photodetector.

In this known arrangement, the feedback effect is essentially defined by the collaboration of the actual laser resonator with an external resonator which is composed of the exit mirror of the laser, of an imaging optics and of the surface of the storage medium acting as a reflector. The relationship between the output power of the laser with and without feedback is predominantly defined by the reflective properties of the storage medium and of the image optics as well.

The feedback effect is an event that is relatively physically complicated. However, it is initially obvious that the laser effectively exhibits fewer radiation losses due to the feedback radiation and therefore oscillates at a higher power level given the same current. Without discussing this in great detail, it should be pointed out that the external resonator also effect modifications of the laser mode in interaction with the actual laser resonator.

In this context, U.S. Pat. No. 3,941,945, whose disclosures are incorporated by reference and which claims priority from German application No. 22 44 119, discloses a further, optical sensor for image plates wherein the surface of the storage medium to be read is incorporated into the laser structure so that the radiation reflected or scattered by it influences the intensity of the light vibration. In order to thereby increase the part of the light directed back into the laser from the storage medium, the end face of the laser directed toward the storage medium can be fashioned as an optical lens and be coated with an antireflection coating. Thus, the focal point of this imaging system should lie in the plane of the surface of the storage medium. A semiconductor diode operating in a non-conducting direction and united with the actual semiconductor laser can thereby be used for detecting the light variation. However, the semiconductor laser diode can also be fed with constant current and the read-out signal can be acquired from the electrical alternating voltage at the laser diode influenced by the intensity of the light vibration.

An information reproduction system is disclosed in U.S. Pat. No. 4,005,259, which is based on the same Japanese application as German Pat. No. 25 05 795. This information disclosure system is also based on the exploitation of the feedback effect. In this sytem, a semiconductor laser is positioned with respect to the storage medium so that emitted light, after passing through the non-reflecting lateral surface facing the storage medium, selectively impinges reflecting or respectively non-reflecting regions of the storage medium and again enters through the non-reflecting lateral face of the laser after the reflection. The different reflectivity of the storage medium is to be matched to the resonance of the laser diode so that an on/off control of the emission of the laser light occurs dependent on the selective incidence of the emitted laser light onto the reflecting or respectively non-reflecting regions of the storage medium. In this known information reproduction system, at least one lens is provided between the exit face of the semiconductor laser and the surface of the storage medium and the lens is provided as imaging optics or respectively for focussing the emitted laser beam onto the surface of the storage medium.

The one thing which is shared by the known write/-read head or respectively by the read heads for an optical storage system in the case of an exclusive read-out memories, is that the laser beam must definitely be focussed on the surface of the storage medium and the imaging optics are therefore arranged between the laser and the surface of the storage medium. Since the distance variations are unavoidable during operation, the assistance of a highly effective control loop guarantees that this focus condition is always observed by readjusting the vertical spacing of the write/read head with reference to the surface of the storage medium. This focus condition is critical in optical storage because, as stated, both read-out signals as well as control signals are derived from the differing light and the exact focussing has an essentially co-determining influence on the signal-to-noise ratio of these signals.

SUMMARY OF THE INVENTION

The present invention is directed to the object of creating a miniaturizable write/read head with an exceptionally simple structure for an optical storage system, particularly a read-only memory. This write/read head is significantly less sensitive with respect to the focal error during writing, or respectively during a read-out event, than traditional sensing heads so that the vertical correction of the head with respect to the surface of the allocated storage medium can be optimumly eliminated at least in the fine range and, thus, one of the critical parameters of the conventional optical storage system is then only of subordinate significance in comparison to the horizontal positioning.

These objects are obtained by an improvement in a miniaturizable write/read head for an optical storage system using an optical storage medium, said system including a control laser as a light source which has one resonator face constructed and arranged with respect to the storage medium so that the light reflected from the storage medium will be fed back into the laser for controlling the intensity of the emitted laser beam. The improvements are that the laser comprises an active medium excited by optical pumping and comprises a reflecting surface residing at a prescribed nominal distance from the storage medium to form one of the resonator faces and said reflecting surface having a prescribed residual radiant transmission, said one reflecting surface being a arcuate surface which is curved towards the medium and has a radius of curvature greater in comparison to the nominal distance, a mode diaphragm being adapted to the wave length of the laser light being provided between the active medium of the laser and the storage medium and being provided for filtering out the transversal fundamental modes of the laser emission, and optical detector elements being arranged adjacent the curved reflecting surface opposite to the storage medium and being arranged symmetrically relative to the optical axis of the laser, said detector elements producing position control signals and data readout signals.

As in known optical storage systems which utilize the feedback effect in a laser, the surface of the storage medium with a reflecting factor differing in accordance with the written information also serves as a reflecting surface for the laser in the storage system of the invention. However, no imaging optics are provided between the active medium of the laser and the storage medium but rather only a mode diaphragm for filtering out a laser mode, for example a transversal fundamental mode, is provided. Instead of an imaging optics, a second, curved reflecting surface is then allocated to the quasi-external resonator surface so that the structure of a hemispherical laser resonator occurs. Given the precondition that the radius of curvature of the curved reflective surface is greater than the prescribed nominal spacing of its apex from the surface of the storage medium, this laser structure is stable in view of the light emission and is, in addition, relatively insensitive in view of the slight fluctuations around this normal spacing which, for example, are to be attributed to the height beat of the moving storage medium fashioned as plate.

The curved reflective surface exhibits a prescribed residual radiant transmission so that the residual light emerging from the back side of the laser can be collected by photoelectric detector elements. These elements are arranged at a prescribed distance from the surface of the storage medium, and are arranged relative to the optical axis of the laser structure or respectively a mirror inverted thereto, and thus offer the possibility of acquiring control, or respectively read-out data signals from combinations of individual detector signals.

With this hemispherical laser structure, distance fluctuations in view of the focussed conditions are significantly less critical, however, the beam diameter on the curved reflective surface is modulated by the distance of the apex of the curved reflective surface from the surface of the storage medium. The detector elements arranged outside of the optical axis are therefore also differently illuminated, so that a focus control signal can be obtained and is capable of serving as a control quantity for an automatic control system for vertical readjustment given distance changes which are no longer negligible. Given a track deviation, the focus of the scanning laser beam lie asymetrically relative to the selected track of the storage medium. This asymmetry leads to a non-uniform illumination of the two detector elements arranged mirror-like inverted, and this will produce a control variable for an automatic control system for horizontal adjustment.

Other advantages of the invention will be readily apparent from the following description, drawings and claims.

DESCRIPTION OF THE PREFERRED EMBODIMENTS

Figure 1:
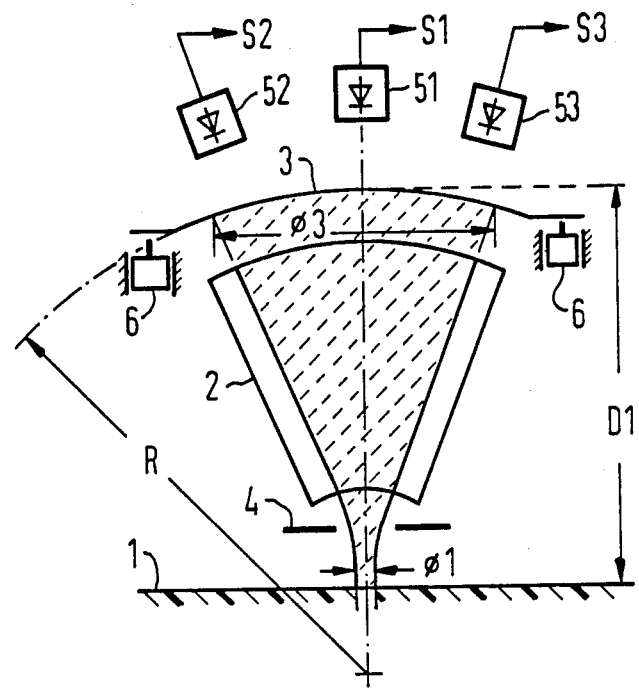
FIG. 1 is a schematic illustration of the miniaturized write/read head for an optical storage system having a hemispherical laser structure in accordance with the present invention being positioned above a storage medium.

The principles of the present invention are particularly useful in an optical storage system utilized with a horizontal surface as illustrated in FIG. 1. In a realized optical storage system, for example, a storage medium 1 would be fashioned as a plate, would be rotationally moved by a drive and would be seated in a housing. The miniaturized write/read head, which is schematically illustrated in FIG. 1, would also be arranged in this housing. Without being shown in greater detail in FIG. 1 the head would be positioned horizontally displaceable for track selection and would be displaceable relative to the storage medium on an axis perpendicularly thereto for vertical positioning. The mechanical arrangements for both vertical and horizontal positioning are known in conventional optical storage systems and are therefore not shown, and are only suggested for purposes of clarity.

The write/read head is schematically shown in FIG. 1 utilizes a laser as a light source. This laser has an active medium 2, for example, which is composed of a glass doped with neodymium. The medium 2 has the shape of a truncated cone comprising curved end faces and is arranged with its axis being perpendicular to the plane of the medium 1 and with the smaller end face positioned above a storage medium 1. The end faces are not mirrored so that the surface of the storage medium 1 forms out of the resonator faces for the laser structure. The other resonator face 3 is formed by a spherically curved surface which is arranged above the active medium 2 and faces toward the storage medium 1. The distance of an apex of this reflective surface 3 from the surface of the storage medium is a distance D1. A mode diaphragm 4 is arranged between the active medium 2 of the laser and the storage medium 1, and this mode diaphragm 4 is fashioned so that the laser structure vibrates in its transversal fundamental mode when, for example, it is excited by optical pumping. A corresponding light distribution of the laser emission is indicated in the broken line shading of FIG. 1.

Figure 2:
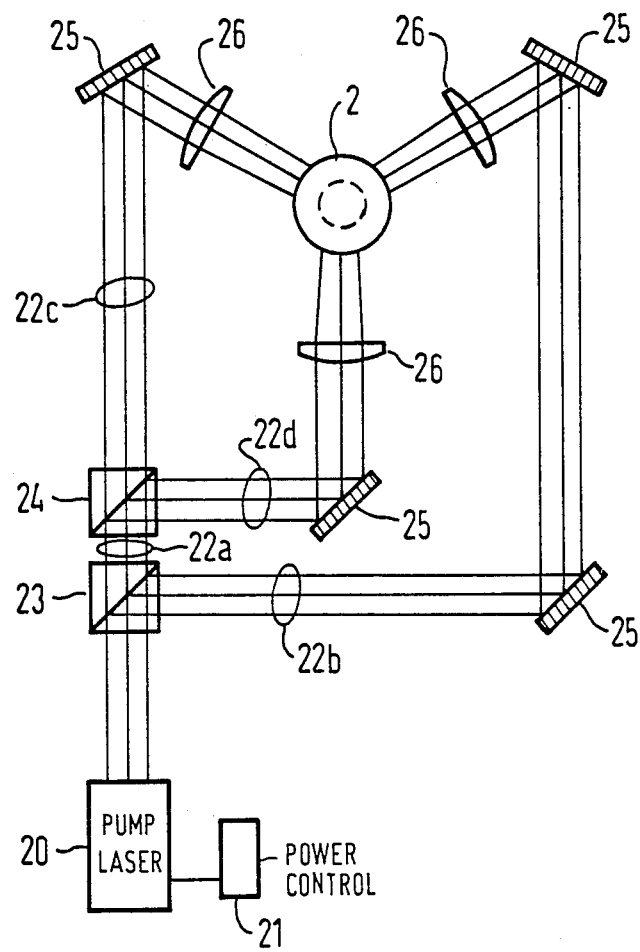
FIG. 2 is a schematic illustration of an optical system which serves for the exciting of the laser structure of FIG. 1 by means of optical pumping.

To excite the laser structure of FIG. 1, a possible pumping means arrangement is illustrated in FIG. 2. This shows a pump laser 20, which is controlled by a power control 21. The embodiment and control of the pump laser corresponds to conventional technology and is, therefore, not shown or set forth in greater detail. A light ray 22 emitted by the pump laser 20 is supplied to the first beam splitter 23 which should exhibit a radiation transmittance of 66% and a diffused reflectance of 33% so that the ray 22 of the pump laser is split into two sub-beams 22a and 22b with the sub-beam 22a having a luminous intensity relationship relative to the beam 22b of 2:1. The first 22a of these two beams is supplied to another beam splitter 24 which divides it into two additional sub-beams, 22c and 22d, each having the same intensity. In accordance with this assumption then the three beams 22b, 22c and 22d have the same intensity. As illustrated, three cylindrical lenses 26 are positioned rotationally symmetrical with respect to the active medium 2. A plurality of reflecting elements 25 are arranged so that each of the sub-beams 22b, 22c and 22d are reflected and directed through a selected one of the cylindrical lenses 26 to impinge on the active medium 2. Thus, light from the pump laser 22 will be directed on the conical surfaces of the active medium 2 from all sides.

This optical pumping makes it possible to excite the hemispherical laser structure of FIG. 1 to generate a population inversion in the active medium 2 of the laser given the assumption that the described structure meets certain conditions. Valid as one condition for the reflective surface 3 is that the distance D1 of its apex from the storage medium 1 is smaller than its radius R of curvature, as schematically illustrated in FIG. 1. In accordance with the standard definition in laser technology, the diameter of the light bundle is the diameter at which the intensity at the edge of the laser beam is lower by precisely the factor $1:e^2$ than the maximum intensity. Given this definition, the following relationship of equation (1) is valid under the above conditions with respect to the spacing and radius of curvature of the curved reflective surface for the focus diameter of the surface of the storage medium. This relationship is derived from equation (11) from an article by Zook et al "Geometric Interpretations of Gaussian Beam Optics", *Applied Optics*, Vol. 11, No. 10, October 1972, pages 2140-2145:

$$\phi 1 = 1.27\lambda \cdot \sqrt[2]{\frac{D1}{R}} \cdot \sqrt[4]{\frac{R-D1}{1.27\lambda}} \quad (1)$$

whereby $\lambda$ is the wavelength of the laser emission and $\phi 1$ is the focus diameter.

The non-linear terms of this relationship show the relative insensitivity of such a write/read head to focus errors.

When observing the forementioned condition, $R - D1 = 1.27\lambda$ is established, then the secondary condition $R \gg \gg \lambda$ is met, the focus diameter is $\phi 1 \approx 1.27\lambda$. In order to obtain some idea for the practical application, the hemispherical laser structure is again based on a Nd-glass laser for which the wavelength $\lambda = 1.05$ $\mu$m is characteristic. At this wavelength, a value of 1.33 $\mu$m then occurs for the focus diameter $\phi 1$, and this agrees well with the desired corresponding value for the diameter of the storage region in an optical storage system.

Valid for the bundle or beam diameter of the distance D1 from the surface of the storage medium 1, for example, at the location of the curved reflective surface 3 is the relationship:

$$\phi 3 = D1 \cdot \frac{1.27\lambda}{\phi 1} \quad (2)$$

Given the above assumption with regard to the wavelength $\lambda$ and the focus diameter $\phi 1$, $\phi 3 \approx D1$ derived from a relationship from equation (2) as a bundle diameter at the location of the curved mirror 3, wherein D1=1 mm could be inserted as a practical oriented example and, thus, the diameter of the curved reflective surface 3 is defined at the same time.

It also becomes clear from the above derivation, however, that a modification of the bundle diameter $\phi 3$ at the reflective surface need not yet be negligibly small and given all changes in the distance D1 of the apex of the curved reflective surface 3 from the surface of the storage medium 1. During practical operations of the optical storage system, such as a case occurs for example, when the rotationally moved storage medium 1 exhibits a vertical beat and the write/read head which contains the laser structure of FIG. 1 is initially considered stationary.

When a slight residual radiant transmittance of a few percent is allowed for the curved reflective surface 3, this property of the hemispherical laser structure can be used, among other things, to also measure the variations of the distance D1 of the apex. To this end, three photoelectric detector elements 51, 52 and 53 are arranged above the curved reflective surface 3 with the detector 51 being on the optical axis of the hemispherical laser structure and the two other detector elements 52 and 53 lying laterally and aligned in a mirror symmetry relative to one another with respect to this optical axis. As symmetrically indicated, each of these detector elements 51-53 emit an allocated output signal s1, s2 or s3, respectively. On the basis of the above explanation, the signal difference $s1 - (s2 + s3)$ is then a measure for the current value of the apex distance D1. Such a difference signal can, therefore, also be used as a control signal for a servo system for vertical adjustment of the write/read head.

To this end, FIG. 1, finally, also schematically shows a means 6 for height adjustment of the write/read head which, due to the small physical dimensions of the hemisherical laser structure, exploits, for example, the piezoelectric effect. These piezoelectric elements are attached to the curved reflective surface 3 and vertically dislocates it for the compensation from the deviations of the prescribed nominal value of the apex distance D1.

However, it is not only variations of the bundle diameter which occur at the curved surface 3 of the hemispherical laser structure, but rather horizontal dislocations of the bundle diameter $\phi 3$ can also be identified.

These are attributed to different reflection conditions at the surface of the storage medium 1. This property can be utilized for the purpose of identifying and correcting undesired horizontal deviations of the scanning laser beam from a prescribed track on the recording medium 1. The broken line shading in FIG. 3 again indicates the light distribution in the hemispherical laser structure under the assumption that the focus of the scanning laser beam lies next to the schematically illustrated track 11 of the storage medium 1. It may be seen from this illustration that the light spot is subjected to lateral excursion at the location of the curved reflective surface 3 as soon as the optical axis of the hemispherical laser structure is horizontally shifted relative to the center of the track 11.

Figure 3:
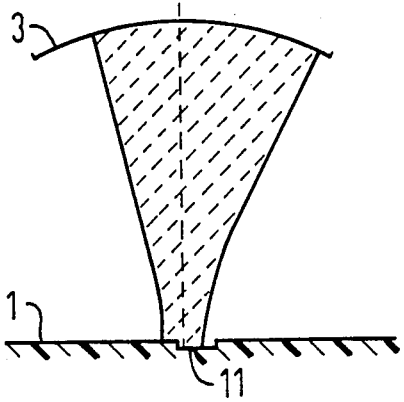
FIG. 3 is a schematic illustration of asymmetry of the light distribution given this laser structure in case of a horizontal deviation of the write/read head from a prescribed track.

When the light spot migrates horizontally on the curved reflective surface 3, then the detector elements 52 and 53 are not uniformly illuminated, as shown in FIG. 3. It follows therefrom that a horizontal track deviation also effects a variation of the difference signal (s2−s3), so that this can be employed as a control signal for a horizontal positioning of the write/read head.

Details of the appropriate servo devices for horizontal and vertical positioning are not described in great detail, since such control systems are extensively known, both for magnetic disk storage as well as for optical storages and such known solutions can also be utilized here.

Finally, it should be pointed out for the sake of completeness that it can be assumed for practical, normal operations that the write/read head is aligned to the track center with a prescribed apex distance D1 upon exploitation of the possibilities for vertical and horizontal positioning. During the read-out event, the hemispherical laser structure will operate at a level with reduced power due to appropriate excitation of the active medium 2 by means of optical pumping. This level suffices in order to distinguish reflecting regions along the selected track 11 of the storage medium 1 from non-reflecting regions. A corresponding modulation of the intensity of the light spot at the curved reflective surface 3 acts as a modulation of the light at the location of the detector element 51 arranged on the optical axis and this detector element 51 emits a corresponding modulated output signal s1. However, it would be just as conceivable to also employ a sum signal of the output signals s1–s3 of the detector elements 51–53 as raw data signals.

Although various minor modifications may be suggested by those versed in the art, it should be understood that I wish to embody within the scope of the patent granted hereon all such modifications as reasonably and properly come within the scope of my contribution to the art.

I claim:

1. In a miniaturizable write/read head for a storage system using an optical storage medium, said system comprising a controlled laser as a light source having resonator faces fashioned and arranged with respect to the storage medium so that light reflected from the medium is fed back into the laser for controlling the intensity of the emitted laser beam, the improvements comprising the laser comprising an active medium excited by optical pumping and having a reflective surface positioned at a prescribed nominal distance from the storage medium forming one of the resonator faces and the reflecting surface having a prescribed residual radiant transmission being fashioned as a surface curved toward the active medium and having a radius of curvature greater in comparison to the nominal distance, a mode diaphragm adapted to the wavelength of the laser light being positioned between the active medium of the laser and the storage medium and being provided for filtering out the transversal fundamental mode of the laser emission, and optical detector elements being arranged adjacent the curved reflective surface opposite from the storage medium symmetrically relative to an optical axis of the laser, said detector elements producing detector signals for position control signals and data read-out signals.

2. In a miniaturizable write/read head according to claim 1, which includes optical pumping means for pumping the active material, said optical pumping means including a power controlled laser and an optical deflecting system for symmetrically directing the output of power controlled laser onto the active medium to optically pump the active medium.

3. In a miniaturizable write/read head according to claim 2, wherein the optical means include at least one beam splitter for dividing the output beam of the pump beam into sub-beams, and imaging devices being provided in the beam paths of the sub-beams for focussing the sub-beams onto the active medium of the write/read head.

4. In a miniaturizable write/read head according to claim 2, which includes a first beam splitter arranged in the beam path from the pump laser, said first beam splitter dividing the pump laser beam into two sub-beams having an intensity ratio of 2:1, a second beam splitter being in the path of the more intense sub-beam, said second beam splitter dividing said sub-beam into two additional sub-beams of equal intensity, said imaging devices including deflecting mirrors and imaging lenses arranged in the beam paths of the three equal intensity sub-beams for focussing the sub-beams onto the active medium in a rotation symmetrical relationship to one another.

5. In a miniaturizable write/read head according to claim 1, wherein the storage medium is movable relative to the write/read head with data information being recorded on said storage medium in parallel tracks, wherein one of the detector elements being arranged on the optically effective axis of the active medium and at least two others being arranged mirror-inverted relative to one another symmetrically with respect to the axis, said horizontal track position of said write/read head being obtained from a difference signal from the two symmetrically positioned elements and a vertical position error being obtained as a malfocus signal from the difference of said signals from the detector element in the axis and the sum of the signals from the other two detector elements.

6. In a miniaturizable write/read head according to claim 5, which includes vertically effective adjustment mechanisms for moving the curved reflective surface, said vertical adjustment mechanism being controllable by a malfocus signal from said detector elements.

7. In a miniaturizable write/read head according to claim 6, wherein said adjustment means comprises piezoelectrically effective elements.

* * * * *